United States Patent [19]

Haruna et al.

[11] Patent Number: 4,727,439
[45] Date of Patent: Feb. 23, 1988

[54] MAGNETIC DISC UNIT SYSTEM

[75] Inventors: Toshiyuki Haruna; Motohiro Nakai; Asao Sasamoto; Kazuo Nakagoshi; Hideaki Amano, all of Odawara, Japan

[73] Assignee: Hitachi, Ltd., Tokyo, Japan

[21] Appl. No.: 860,983

[22] Filed: May 8, 1986

[30] Foreign Application Priority Data

May 27, 1985 [JP] Japan .................... 60-113349

[51] Int. Cl.$^4$ .............................................. G11B 5/09
[52] U.S. Cl. ................................................... 360/49
[58] Field of Search ................. 364/200, 900; 360/49, 360/77, 78, 98

[56] References Cited

U.S. PATENT DOCUMENTS

| 4,145,745 | 3/1979 | De Bijl | 364/200 |
| 4,231,088 | 10/1980 | Hammer | 364/200 |
| 4,403,288 | 9/1983 | Christian | 364/200 |
| 4,467,421 | 8/1984 | White | 364/200 |

Primary Examiner—Gareth D. Shaw
Assistant Examiner—John G. Mills
Attorney, Agent, or Firm—Antonelli, Terry & Wands

[57] ABSTRACT

A magnetic disc unit capable of improving the throughput by minimizing the seek time for the magnetic head. The magnetic disc unit is operative to respond to a cylinder address instructed by the host unit to move the magnetic head to the corresponding cylinder position on the magnetic disc comprises a cylinder address/position assignment selecting circuit for changing the address instructed by the host unit into a new address so as to desirably change cylinder address/position assignments. A head location controlling circuit is responsive to the new address to move the magnetic head to a cylinder position corresponding to the new address. In one mode, the cylinder address/position assignment selecting circuit performs renewal of cylinder addresses such that the magnetic head passes along the magnetic disc through all of the cylinder positions designated by cylinder addresses by making a return trip between inner and outer circumferences of the magnetic disc. In another mode, the cylinder address/position assignment selecting circuit performs renewal of cylinder addresses that when the innermost cylinder address is substituted for a cylinder address instructed by the host unit, the access time for the substitutive cylinder address is minimized.

3 Claims, 7 Drawing Figures

FIG. 4
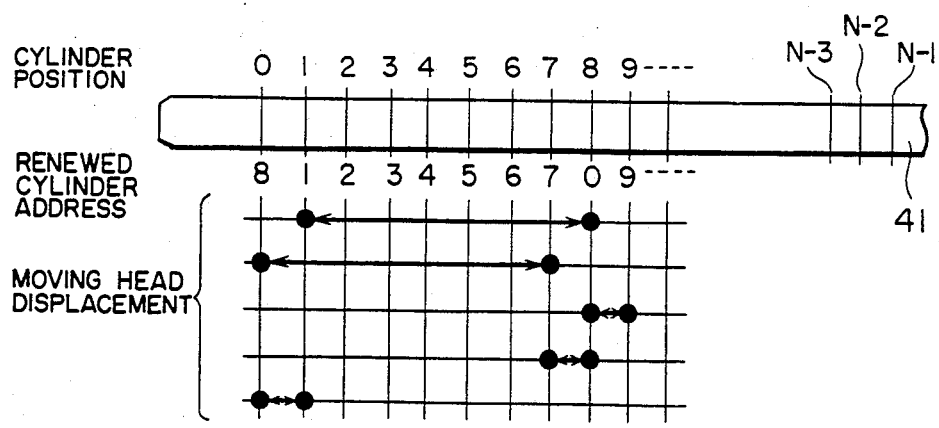
FIG. 6A
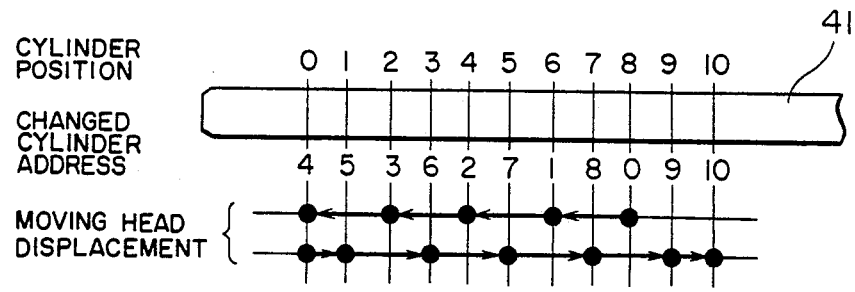
FIG. 6B

MAGNETIC DISC UNIT SYSTEM

BACKGROUND OF THE INVENTION

This invention relates in general to a magnetic disc unit system and more particularly to a magnetic disc unit suitable for changing a cylinder address designated by a host unit into a different cylinder address by maintaining correspondence with the physical (cylinder) address associated with the magnetic disc.

Due to the development of information processing systems, widespread use has been made of the magnetic disc, particularly, for storing therein an operating system program. The magnetic disc unit has a plurality of such magnetic discs which are stacked vertically, for example. Each magnetic disc 41 has a magnetic disc surface as shown in FIG. 1. More particularly, the magnetic disc surface is formed, at its innermost and outermost circumferences, with guard portions respectively termed an inner guard band (IGB) and an outer guard band (OGB) and with an intermediate portion between the inner and outer bands which is allotted with cylinder addresses 0, 1, 2, . . . , N-3, N-2 and N-1 (N is an integer) sequentially numbered from the outer to the inner circumferences. The magnetic disc unit includes an access mechanism which is responsive to a cylinder address instructed by the host unit to move the magnetic head to a position corresponding to the instructed cylinder address, for implementation of a read/write processing of data.

The process for movement of the magnetic head, i.e., seek operation will be explained with reference to a flow chart shown in FIG. 2. In a step 101, the magnetic disc unit is powered-up (power on) and first initialized. In a step 102, a rezero operation is implemented to return the magnetic head to a position corresponding to the cylinder address "0". Subsequently, in a step 103, "000" representing the cylinder address for the present position is set in an internal register $A_{Reg}$. The rezero operation is then carried out. In the rezero operation, the present head position is detected by moving the head to the outer area of the cylinder address area and reading out of the guard band information recorded on the inner guard band IGB and the outer guard band OGB so that the magnetic head is positioned on the boundary position between the OGB and the cylinder address area, that is cylinder address "0". Once the rezero operation is completed, a seek operation can be implemented such that the number of cylinders through which the magnetic head passes reflects an ultimate cylinder address for the head.

Responsive to a seek instruction from the host unit, an internal register $B_{Reg}$ is set with a cylinder address representative of a destination, and the difference in the addresses is calculated from the value or contents of register $B_{Reg}$ and the value of register $A_{Reg}$ to determine a moving direction and an amount of movement of the magnetic head. The results are set in an internal register $C_{Reg}$, and the magnetic head is moved by the access mechanism responsive to the contents of the register $C_{Reg}$ to reach the destined cylinder position (steps 104 to 107).

As described above, conventionally, the seek operation is controlled using sequential cylinder addresses which are allotted to the magnetic disc 41. Accordingly, if a change in the correspondence of a cylinder address with the physical position of the magnetic head corresponding thereto is needed because of, for example, an occurrence of a defective cylinder address, the host unit is then required to change its program for the seek instruction. Further, since in conventional magnetic disc units the first cylinder position which the magnetic head initially encounters as it moves from the OGB to the data area in the intermediate portion is defined as cylinder address "0" for seek operation control, it has been impossible to produce a magnetic disc unit capable for changing the cylinder address.

A device related to this type of arrangement for seek operation control by using the magnetic head with the IGB and OBG may be seen in, for example, British Pat. No. 1435368.

SUMMARY OF THE INVENTION

This invention overcomes the above problems encountered in conventional units and has for its object to provide a magnetic disc unit which can desirably assign a cylinder address designated by the host unit to a physical cylinder position on the magnetic disc in a simple and inexpensive manner.

Another object of this invention is to provide a magnetic disc unit capable of improving access to the cylinder position.

For attainment of the above objects according to teachings of the present invention, in a magnetic disc unit which responds to a cylinder address from the host unit to locate the magnetic head at a corresponding cylinder position on the magnetic disc, there is provided a cylinder address/position assignment selecting circuit which permits the cylinder address to be changed so that it can be assigned to a different cylinder position on the magnetic disc, whereby the magnetic head can be located in accordance with results of the assignment process by the cylinder address/position assignment selecting circuit.

BRIEF DESCRIPTION OF THE DRAWINGS

FIG. 4 is a diagram showing a cylinder address/position assignment in accordance with the FIG. 3 embodiment;

FIGS. 6A and 6B are diagrams useful in explaining a correspondence table for cylinder address/position assignment.

DESCRIPTION OF PREFERRED EMBODIMENTS

The invention will now be described by way of example with reference to the accompanying drawings.

Figure 3:
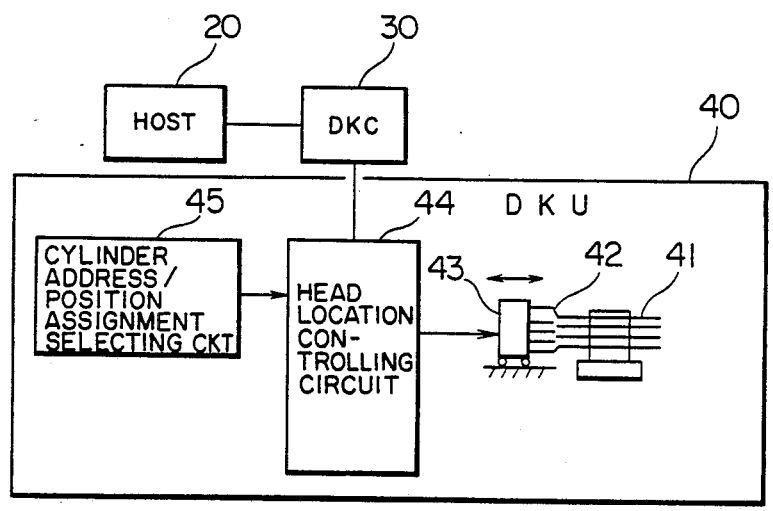
FIG. 3 is a schematic block diagram showing a system incorporating a magnetic disc unit according to an embodiment of the invention.

Referring to FIG. 3, there is illustrated in block form a system incorporating a magnetic disc unit embodying the present invention. The system comprises the magnetic disc unit, generally designated at 40, including a set of magnetic discs 41 for storing various kinds of data, a set of magnetic heads 42 for read/write of the data stored in the magnetic disc set 41, an actuator 43 for moving the magnetic head set 42, a head location controlling circuit 44 for controlling the actuator 43 and a cylinder address/position assignment selecting circuit 45 for selectively changing cylinder address assignment in a manner to be described hereinafter, a host unit 20 serving as an external memory of the magnetic disc unit 40, and a magnetic disc controller 30 for controlling the magnetic disc unit 40. The cylinder address/position assignment selecting circuit 45 has a programmable read only memory PROM for storing a correspondence table between physical cylinder positions and changed cylinder addresses. In addition, it contains a register CYL $A_{Reg}$ and a register CYL $B_{Reg}$ to be described later.

Figure 5:
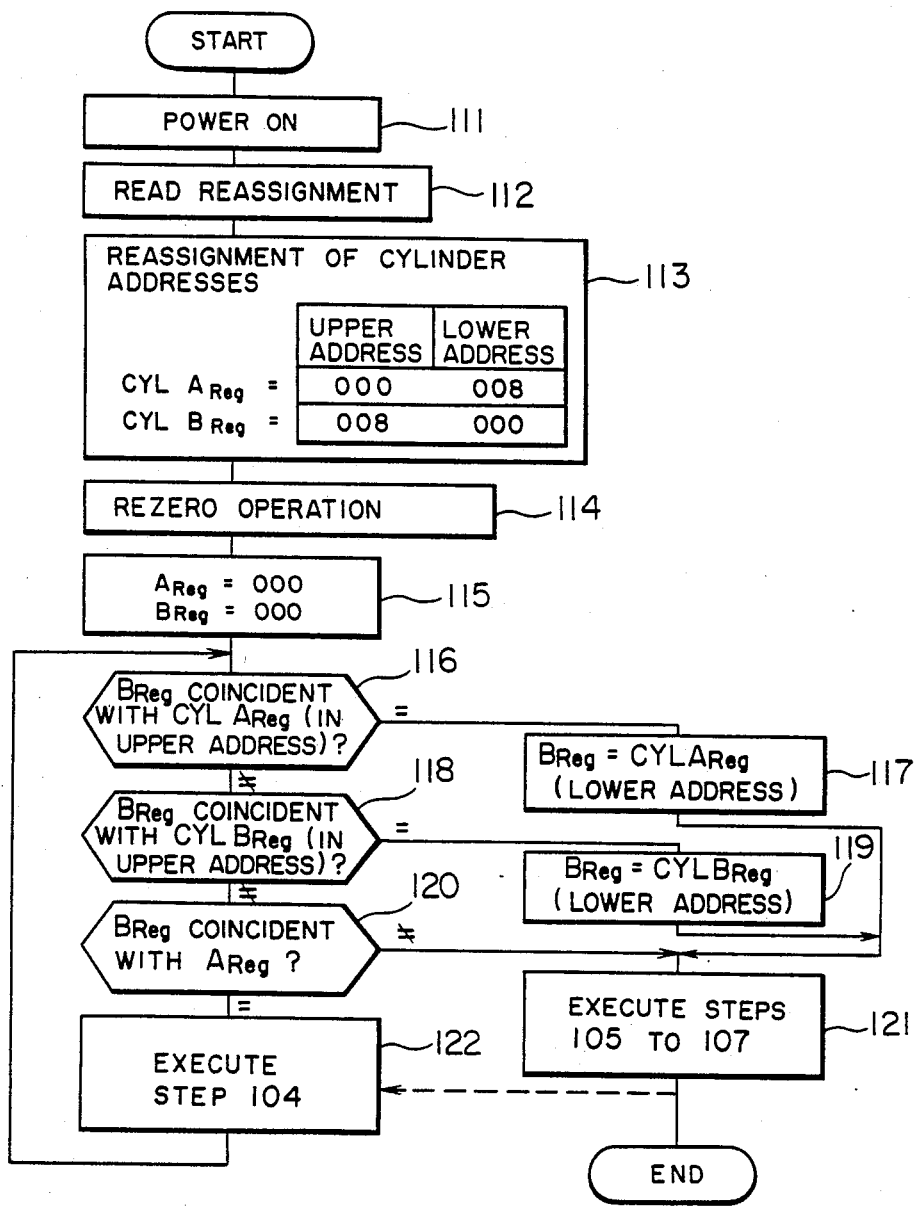
FIG. 5 is a flow chart showing processings in the FIG. 3 embodiment.

Normally, the magnetic disc unit 40 responds to a cylinder address instructed by the host unit 20 via the magnetic disc controller 30 so as to cause the actuator 43 to move the magnetic head set 42 (hereinafter simply referred to as magnetic head 42) to a position, i.e., physical cylinder position corresponding to the instructed cylinder address, thereby implementing a read/write processing of data stored in the magnetic disc set 41 (hereinafter simply referred to as magnetic discs 41). In the event of occurrence of, for example, a defective cylinder address, the cylinder address/position assignment can be changed or renewed as desired in accordance with the teachings of the present invention. Thus, assume that the host unit initially instructs a destination to position "0" and that original cylinder addresses "0" and "8" for cylinder positions "0" and "8" are to be exchanged as shown in FIG. 4. In this instance, upon power-up, the head location controlling circuit 44 first performs initialization so that it reads changed cylinder addresses from the cylinder address/position assignment selecting circuit 45 to reassign, in step 113, the cylinder addresses by setting the forms of exchange of "0" to "8" and "8" to "0" in the internal registers CYL $A_{Reg}$ and CYL $B_{Reg}$, respectively (steps 111 to 113), as shown in FIG. 5. In the reassignment, both the internal registers are set such that the upper address represents the contents of a physical cylinder position and the lower address represents the contents of the changed cylinder address.

Figure 1:
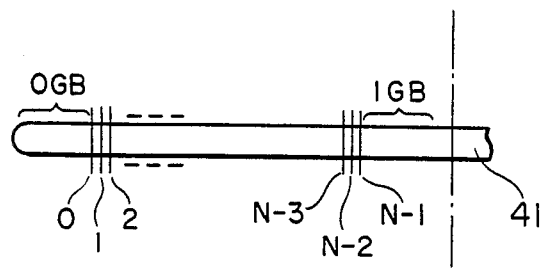
FIG. 1 is a diagram showing a cylinder address allocation in prior art techniques.
Figure 2:
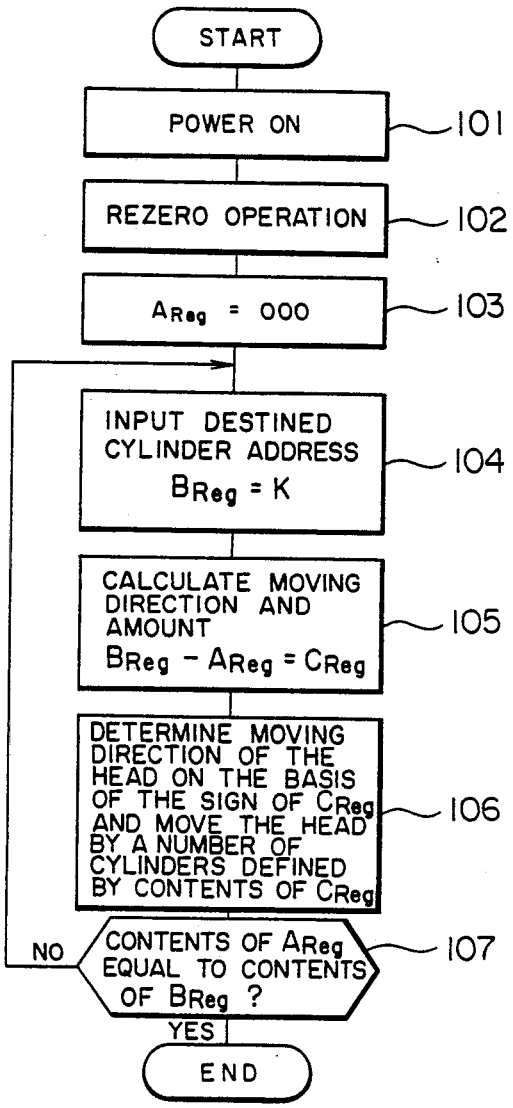
FIG. 2 is a flow chart for processings in a prior art magnetic disc unit.

Thereafter, a rezero operation, as defined in the step 102 described previously, is implemented to move the magnetic head 42 to the cylinder position "0" and registers $A_{Reg}$ and $B_{Reg}$ similar to those explained in connection with the FIGS. 1 and 2 are then set with contents "000" representative of the addresses corresponding to the present position and the destined position, respectively (steps 114 and 115).

Subsequently, control is effected to determine whether address/position assignment is changed for the physical cylinder position "0", by retrieving the contents of the register $B_{Reg}$ which coincides with the upper address contents of either of the registers CYL $A_{Reg}$ and CYL $B_{Reg}$. In this example, since the initial instruction by the host unit is for movement to the "0" position and the assignment is changed or renewed so that the contents "000" of the register $B_{Reg}$ coincides with the upper address contents "000" of the register CYL $A_{Reg}$, the lower address contents "008" of the register CYL $A_{Reg}$, is set into the register $B_{Reg}$, indicating that the destination address for the reassignment is "8". Thus, through the steps 105 to 107 explained with reference to FIGS. 1 and 2, the magnetic head 42 is moved to the physical cylinder position "8" now corresponding to the renewed cylinder address "0" (steps 116 to 119 and 121).

Successor control permits the register $B_{Reg}$ to be set with a cylinder address from the host unit and examines in the same manner as set forth above the need for reassignment (in this example, there is no reassignment until the physical cylinder position "8"), so that the actuator 43 may respond to results of examination to move the magnetic head 42 to a destined cylinder position (steps 120 and 122). Again, in the example of FIG. 4, a cylinder address for cylinder position "8" from the host unit is reassigned such that the magnetic head is moved to the position "0" by this cylinder address instruction. In this manner, the magnetic head 42 is moved to the physical cylinder position "0" when the magnetic disc controller 30 instructs the cylinder address "8" and to the physical cylinder position "8" in response to the cylinder address "0" instructed by the magnetic disc controller 30.

It should be appreciated that the FIG. 4 example is illustrative of the present invention, presenting a preferred embodiment of the reassignment according to the invention wherein as shown in FIG. 4 the seek time is prolonged for the moving head displacement in response to the cylinder movement instructions "0"⟷"1", "7"⟷"8" and "8"⟷"9" but it can advantageously be minimized for reassigned instructions "0"⟷"9", "0"⟷"7" and "1"⟷"8".

In another embodiment of the reassignment according to the present invention, a correspondence table for cylinder address/position assignment as shown in FIG. 6A is stored in the PROM included in the cylinder address/position assignment selecting circuit 45 and reassignment is implemented in accordance with the stored correspondence table. In contrast to the simple exchange between the cylinder addresses "0" and "8" in the FIG. 4 embodiment, the allocation of cylinder addresses in the embodiment shown in FIG. 6A is changed in the correspondence table such that cylinder addresses 0, 1, 2, . . . (N-1) are allocated at intervals of two tracks. As will be seen from a diagrammatic representation of moving head displacement shown in FIG. 6B, a seek operation responding to an instruction for sequential cylinder movement through all of the cylinder positions, i.e., from "0" to "10" can be completed by simply causing the magnetic head to make a return trip between the inner and outer circumferences of the magnetic disc. In other words, the magnetic head begins at one guard band and moves toward the other guard band accessing every other cylinder position, corresponding to new cylinder addresses, then return to the beginning guard band in a similar manner. Advantageously, this improves throughput of the system.

Thus, according to the present invention, by setting the cylinder address/position assignment selecting circuit 45 as desired or referring to a desirably predetermined address/position correspondence table incorporated in the selecting circuit 45, the magnetic head 42 can be moved to and located at a desired cylinder position associated with the magnetic disc 41 under the direction of a cylinder address instructed by the host unit. Consequently, (i) In the event that a cylinder track designated by a cylinder address instructed by the host unit 20 turns out to be defective, the cylinder address/position reassignment can readily be accomplished as desired without resort to interchange of magnetic discs in the magnetic disc set 41 or exchange of the magnetic disc unit 40 per se;

(ii) When the cylinder address/position reassignment is such that the innermost cylinder substitutes for the defective track, the access time for the substituted cylinder can be minimized to improve throughput of the system; and (iii) Where intercommunication between the host unit 20 and magnetic disc controller 30 is effected through the medium of logical addresses, the host unit 20 is not permitted to effect change of address which is done only by the magnetic disc controller 30, with the result that improvements in system throughput can not be expected. Even in such a case, throughput of the system can advantageously be improved using the correspondence table according to the present invention.

If the PROM included in the cylinder address/position assignment selecting circuit 45 in accordance with the foregoing embodiment is combined with an additional four switches, a maximum of 16 types of changeable patterns (correspondence tables) can be obtained. Moreover, if addresses of the PROM are numbered in correspondence with physical cylinder positions, physical cylinder addresses in the correspondence table may be omitted.

As described above, according to the invention, by setting the cylinder address/position assignment selecting circuit as desired or referring to the correspondence table for cylinder address/position assignment included in the selecting circuit, the magnetic head can be located at a desired cylinder position associated with the magnetic disc under the direction of a cylinder address instructed by the host unit.

What is claimed is:

1. A magnetic disc unit system comprising:
    a host unit;
    a controller means;
    at least one magnetic disc having a plurality of cylinder positions corresponding to a plurality of cylinder addresses assigned thereto;
    at least one magnetic head operable to be located at a cylinder position on said at least one magnetic disc, for reading/writing of data stored on said at least one magnetic disc at the corresponding cylinder position;
    actuator means responsive to said controller means and to cylinder addresses output from said host unit for locating said at least one magnetic head at cylinder positions corresponding to said cylinder addresses;
    cylinder address/position assignment selecting means for changing at least one cylinder address output from said host unit into at least one new cylinder address so as to change at least one cylinder position corresponding to said at least one cylinder address into a new cylinder position corresponding to said at least one new cylinder address; and
    head location controlling means responsive to said controller means and said at least one new cylinder address, for driving said actuator means such that said at least one magnetic head is moved to a new cylinder position corresponding to a respective new cylinder address;
    wherein said cylinder address/position assignment selecting means changes said at least one cylinder address such that said at least one magnetic head moves through said at least one new cylinder position corresponding to said at least one new cylinder address by making a return trip between inner and outer circumferences of said at least one magnetic disc.

2. A magnetic disc unit system according to claim 1, wherein said cylinder address/position assignment selecting means comprises a memory for storing a correspondence table for cylinder address/position assignments.

3. A magnetic disc unit system according to claim 2, wherein said memory comprises a PROM.

* * * * *